2 Sheets. Sheet 1.
L. E. Hopkins,
Felting Machine.
No. 476. Reissued June 30, 1857.
Fig. 2. Fig. 1
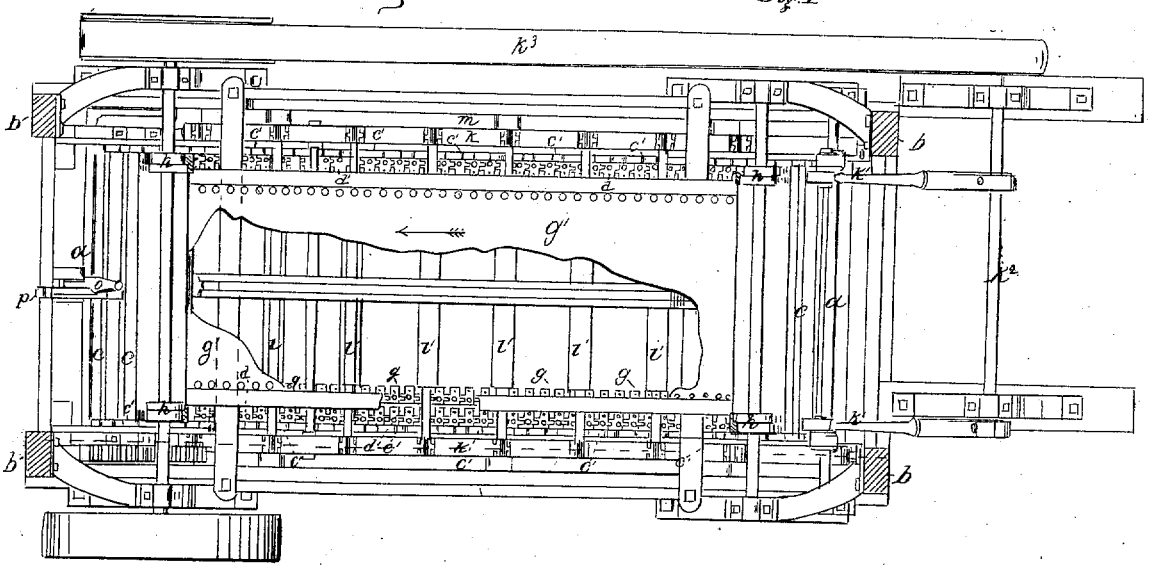
Fig. 1.
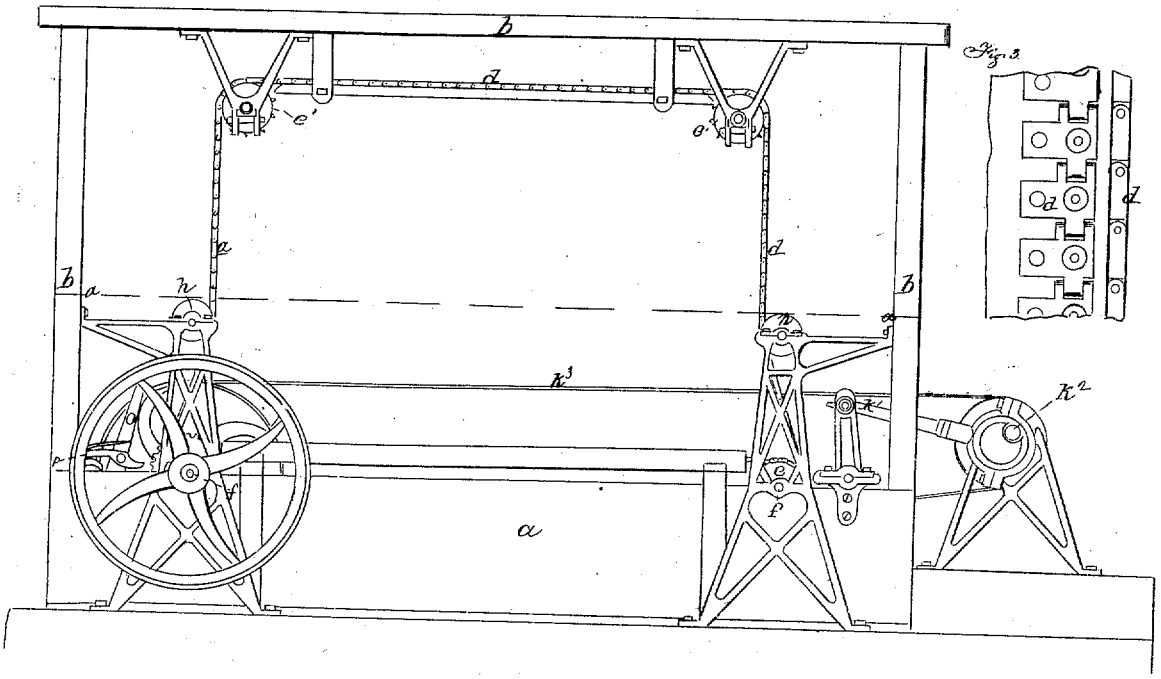
Fig. 3.
N. PETERS, PHOTO-LITHOGRAPHER, WASHINGTON, D. C.

L. E. Hopkins.
Felting Machine.
No. 476. Reissued. June. 30. 1857.
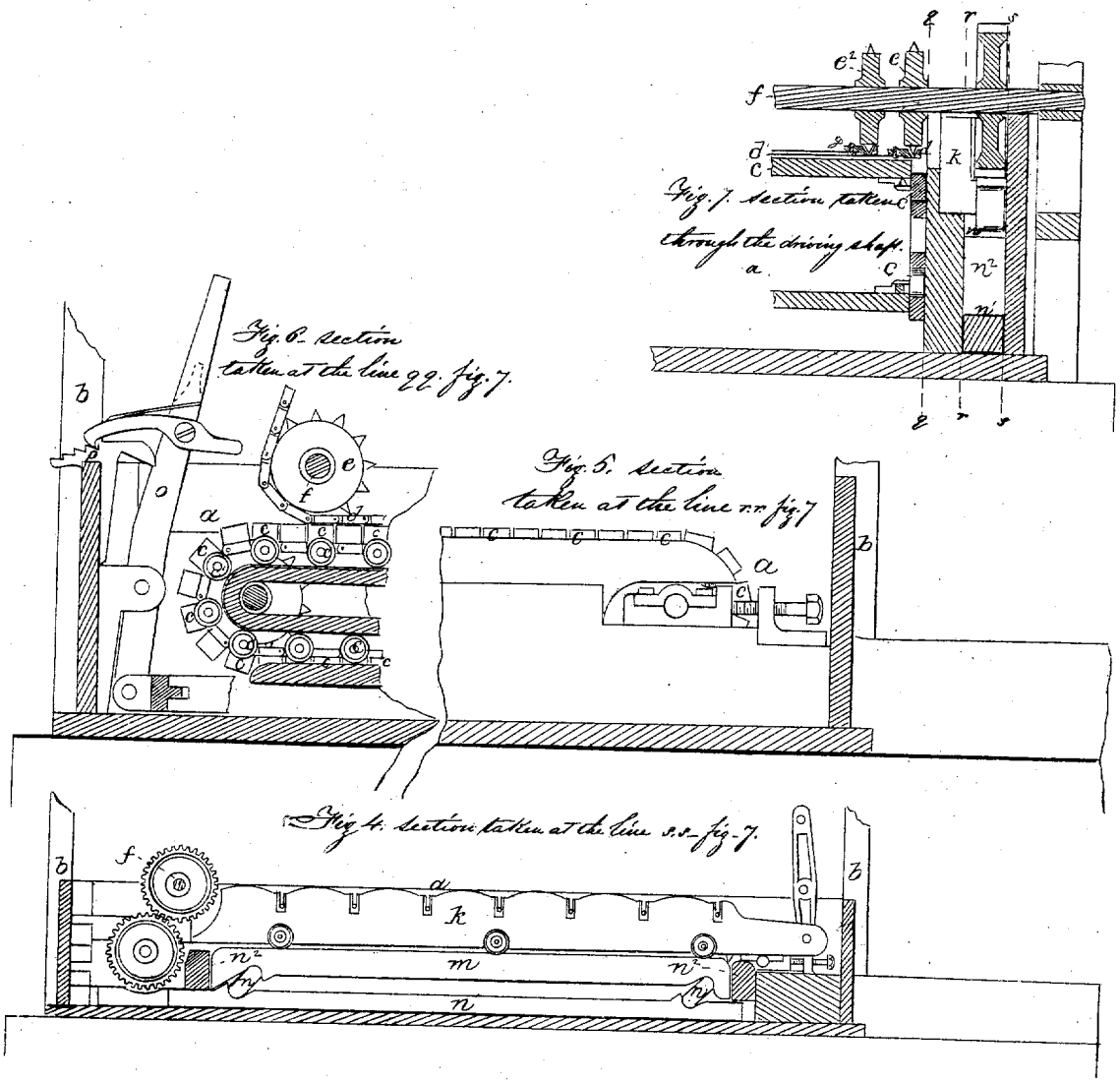

UNITED STATES PATENT OFFICE.

LANSING E. HOPKINS, OF DANBURY, CONNECTICUT, ASSIGNOR TO JAMES S. TAYLOR, HIRAM L. STURDEVANT, AND ELIJAH STURDEVANT, OF DANBURY, CONNECTICUT.

MACHINE FOR MANUFACTURING HAT-BODIES.

Specification forming part of Letters Patent No. 9,450, dated December 7, 1852; Reissued June 30, 1857, No. 476.

*To all whom it may concern:*

Be it known that LANSING E. HOPKINS, of New York, N. Y., has invented certain new and useful Improvements in Hat-Felting Machines, and that the following is a full, clear, and exact description of the same, reference being had to the accompanying drawings and to the letters of reference marked thereon.

The nature of this invention consists in the arrangement of the endless revolving planking table and the series of planking rollers of peculiar form and movement, as will be hereinafter described.

In order that others may construct and use this invention, its construction and operation will now be given.

In the accompanying drawings which make a part of this specification (*a*) is a battery being made sufficiently stout to support the cylinders and moving parts—which will be hereinafter described. Within the battery and entirely below the top of the trough there is an endless planking table, formed of two endless chains of metal, one on each side with slats (*c*) extending from one to the other and forming when stretched in a straight line a solid table. As their edges join they pass around carrying rollers at either end and are supported on a rail way at the sides on which small rollers (*c'*) (attached to the slats) run similar to a revolving platform horse power. There are extending from side to side of the battery a series of rollers (*i*, *i*) which can be made to bear with any desired pressure upon the planking table. They are hung in a carriage *k* which has a reciprocating motion in ways on either side of the battery. It is moved by pitman *k'* which connects it with eccentrics on a revolving shaft at $k^2$, driven by a band ($k^3$) connecting with the prime mover.

The rollers are of two kinds, a portion of them being polygonal, which roll back and forth over the stock and serve to beat it up and make it work lively. The others are round, and as the stock passes along under them they move back and forth, with a short rapid motion, and thus produce the desired action upon the stock. To cause the proper pressure of the roller the ways (*m*) upon which the carriage (*k*) slides, are made to rise by being attached to two or more short arms (*n*) which are jointed to a movable piece (*n'*) having an endless motion, as it is designed to move either one way or the other. The ways rise or fall like a parallel ruler, it being guided in its up or down motion by stops ($n^2$) on the battery. To move the lower pieces (*n'*) they are connected with the lever (O) that extends up above the battery at one end and from it projects a hook that catches into a rack (*p*) to hold it in any desired position.

When a machine thus constructed is put in motion the stock after being rolled in a cloth is laid upon the endless planking table and passed between said table and rollers (*i*) and thus moving forward and back, being at first lightly and then harder, they work the stock till it is perfectly felted. Every time the stock comes around it is handled by the workmen, examined and again rolled in a cloth and submitted to the action of the rollers and can thus be finished in the most perfect and rapid manner. After the stock is finished it is taken out and a new supply put in.

This machine is intended to be worked in connection with a hat forming machine.

Having thus fully described this invention what is claimed to be the invention of LANSING E. HOPKINS, is—

The method of felting hats by passing them or rolling them between the revolving endless planking table, and a series of rollers as described or their equivalents whereby a vibrating, reciprocating and forward motion is communicated to the hat; thereby working it in a perfect manner, but this we claim only when the vibrating and reciprocating motion is communicated to the hats in the direction of the revolving motion of the traveling belt, so as as to give the hats a rolling motion alternately forward and back as they pass through the machine.

JAMES S. TAYLOR.
HIRAM L. STURDEVANT,
Per JAS. S. TAYLOR,
*Administrator.*
ELIJAH STURDEVANT,
Per JAS. S. TAYLOR,
*Attorney.*

Witnesses:
T. M. WEED,
GEO. C. LYON.

[FIRST PRINTED 1911.]